No. 724,749. PATENTED APR. 7, 1903.
A. SODERLING.
FRICTION CLUTCH.
APPLICATION FILED AUG. 2, 1902.
NO MODEL.
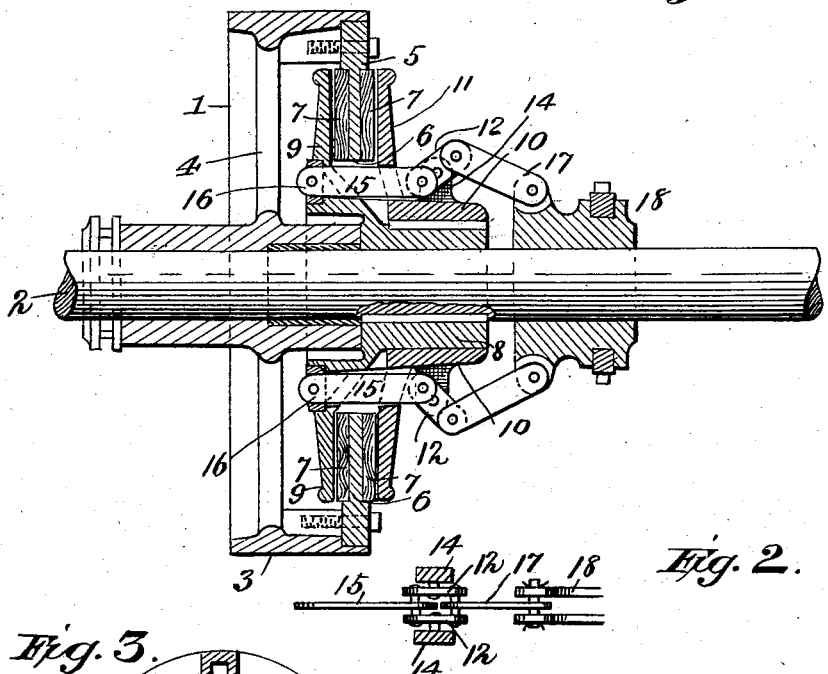
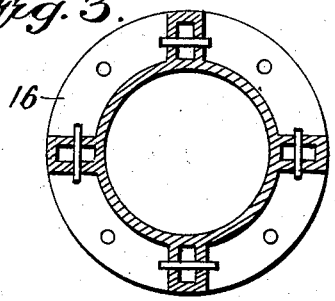
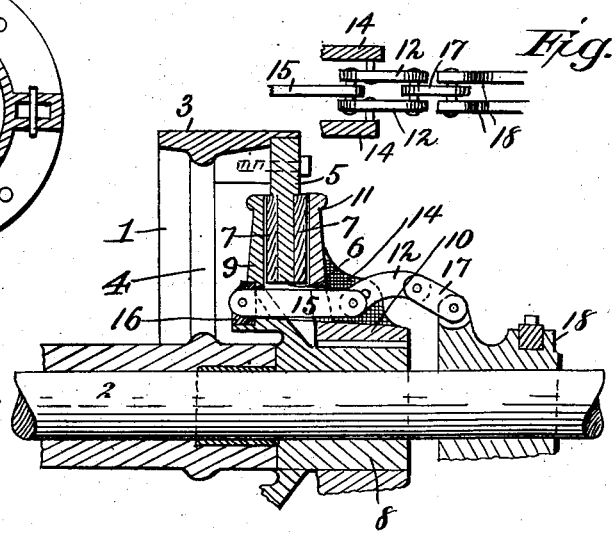
Witnesses
Franck L. Ourand
A. A. Sellhausen
Inventor
Alfred Soderling
by Wm Archer Roberts
Attorney

UNITED STATES PATENT OFFICE.

ALFRED SODERLING, OF CHICAGO, ILLINOIS.

FRICTION-CLUTCH.

SPECIFICATION forming part of Letters Patent No. 724,749, dated April 7, 1903.

Application filed August 2, 1902. Serial No. 118,098. (No model.)

*To all whom it may concern:*

Be it known that I, ALFRED SODERLING, a citizen of the United States, residing a Chicago, in the county of Cook and State of Illinois, have invented certain new and useful Improvements in Friction-Clutches, of which the following is a specification.

My invention has relation to friction-clutches; and it consists in the novel construction and arrangement of its parts, as hereinafter described.

The object of my invention is to provide a friction-clutch of simple construction and positive operation, the clutch being so constructed as to transmit rotary motion from a shaft to a pulley loosely journaled on the shaft, the clutch being provided with parts having annular surfaces forming jaws which grip between them an auxiliary plate or ring carried by the pulley. Thus the friction-surface is distributed over a large area.

The principal features of my invention reside in a series of links and levers connected to the said jaws for manipulating the same by the lateral movement of a collar carried by the shaft.

In the accompanying drawings, Figure 1 is a transverse sectional view of the clutch, showing one form of the links and levers. Fig. 2 is a top plan view of the links and levers as used in Fig. 1. Fig. 3 is a face view of an annulus, partly in section, which is used upon the inner jaw of the clutch. Fig. 4 is a sectional view of a portion of the clutch, showing a modified view of the links and levers; and Fig. 5 is a top plan view of the links and levers as used in Fig. 4.

The pulley 1 is loosely journaled on the shaft 2. The periphery of the pulley is provided with the ordinary belt-surface 3. The spokes or web 4, connecting the rim of the pulley with the hub of the same, are located to one side of the middle of the rim, as shown in Figs. 1 and 4. To the right-hand edge of the rim of the pulley is attached an annular plate or ring 5, said ring or plate having a central opening 6, through which one of the jaws of the clutch mechanism (hereinafter described) and the shaft 2 passes. The sides of the plate 5 about the opening 6 are provided with an annular ring 7, the outer faces of which form the friction-surfaces against which the jaws of the clutch mechanism are adapted to operate. Said rings 7 may be made of wood or any other suitable material. The sleeve 8 is keyed to the shaft 2, the inner end of said sleeve being provided with an annular clutch-jaw 9, which passes through the opening 6 of the plate 5 and is adapted to engage the face of the inner ring 7. The sleeve 10 is keyed to the sleeve 8. The inner end of the said sleeve 10 is provided with an annular jaw 11, which is adapted to engage the face of the outer ring 7.

It will be observed that the sleeve 8 may be moved longitudinally along the shaft 2, and the sleeve 10 may be moved longitudinally along the sleeve 8, and a means is provided for moving the said sleeves simultaneously in opposite directions, whereby the clutch-jaws 9 and 11 are made to engage or disengage the rings 7.

The levers 12 are fulcrumed between the lugs 14 of the sleeve 10. The inner ends of the said levers 12 are pivotally connected, by means of the links 15, with the annulus 16 carried by the jaw 9 of the sleeve 8. The outer ends of the lever 12 are connected, by means of the links 17, to the sliding collar 18, located on the shaft 2. A suitable means (not shown) may be provided for sliding the collar 18 along the shaft 2.

The operation of the device is as follows: Presuming the parts to be in the position as shown in Fig. 1, the collar 18 is moved toward the pulley-wheel 1, the links 17 force the outer ends of the levers 12 away from the shaft 2, and consequently the inner ends of the said levers 12 move toward the said shaft. Thus through the links 15 the clutch-jaw 11 is forced against the outer ring 7, and simultaneously the clutch-jaw 9 is drawn against the inner ring 7, and the friction thereby created transmits rotary motion from the shaft 2 through the clutch mechanism to the pulley 1. By reversing the operation above described the clutch-jaws 9 and 11 are made to disengage the ring 7, and the transmission of the rotary motion above referred to is interrupted.

The difference in construction of the mechanisms as shown in Figs. 1 and 4 resides in the levers 12. As shown in Fig. 1 a straight lever is used, with the links pivoted at equal distances from the fulcrumed point, while in Fig. 4 a curved lever is used, with the links pivoted at different distances from the fulcrumed point. By using the form of the invention as shown in Fig. 2 the clutch-jaws may be made to engage the ring 7 with greater force, for the reason that one end of the lever is longer than the other, and consequently a greater amount of leverage is afforded, the curve in the lever 12 making the parts more compact and having a tendency to strengthen the lever, for the reason that the strain is inclined to be along the length of the lever rather than laterally across the same.

Having described my invention, what I claim as new, and desire to secure by Letters Patent, is—

A friction-clutch consisting of a pulley journaled on a shaft, a plate having an open center attached to said pulley, telescoping sleeves carrying clutch-jaws adapted to engage the opposite sides of said plate, a curved lever fulcrumed to the sleeve of the outer jaw, a link passing through the outer clutch-jaw and pivotally connecting the inner end of the said lever and passing through the central opening of the plate and connecting the inner jaw, a link pivotally connecting the outer end of the said lever with a sliding collar located upon the shaft, the line of curvature of the said lever being from an angle to the longitudinal axis of the first-said link toward the line of direction of the last-said link.

In testimony whereof I affix my signature in presence of two witnesses.

ALFRED SODERLING.

Witnesses:
PETER AIKMAN,
HENRY SODERLING.